(12) United States Patent
Chen

(10) Patent No.: US 6,809,844 B1
(45) Date of Patent: Oct. 26, 2004

(54) SCANNER WHICH ADJUSTS THE IMAGE INDUCED VOLTAGE BY CONTROLLING THE EXPOSURE TIME OF THE SENSORS

(75) Inventor: Michael Chen, Hsin-Chu (TW)

(73) Assignee: Avision Inc., Hsin-Chu Hsien (TW)

( * ) Notice: Subject to any disclaimer, the term of this patent is extended or adjusted under 35 U.S.C. 154(b) by 0 days.

(21) Appl. No.: 09/451,095

(22) Filed: Nov. 30, 1999

(30) Foreign Application Priority Data

Sep. 15, 1999 (TW) .......................... 88115935 A

(51) Int. Cl.[7] ................................ H04N 1/04
(52) U.S. Cl. ................ 358/474; 358/475; 358/412; 250/208.1
(58) Field of Search ................ 358/474, 485, 358/507, 505, 442, 475, 498, 473, 409, 412, 483, 486, 488; 250/208.1

(56) References Cited

U.S. PATENT DOCUMENTS 3,911,213 A * 10/1975 Tregay et al. .............. 358/474
4,314,179 A * 2/1982 Tooyama et al. ........... 315/12.1
5,956,158 A * 9/1999 Pinzarrone et al. ......... 358/474

* cited by examiner

Primary Examiner—Edward Coles
Assistant Examiner—Heather D Gibbs
(74) Attorney, Agent, or Firm—Winston Hsu

(57) ABSTRACT

The present invention provides an optical scanner that adjusts the image-induced voltage by controlling the exposure time of the sensors. The optical scanner comprises a scanning module comprising a plurality of color detectors for detecting light of different colors when scanning a document to generate corresponding electric charge, a cathode-ray tube for providing light to the document, a power supply for supplying power to the cathode-ray tube, and a control circuit for controlling operations of the optical scanner and the power supply. The control circuit controls an exposure time of each of the color detectors according to the sensitivity of the color detector to its corresponding color of light so that the amount of electric charge generated by each of the color detectors during each exposure is controlled and properly scaled.

10 Claims, 2 Drawing Sheets

SCANNER WHICH ADJUSTS THE IMAGE INDUCED VOLTAGE BY CONTROLLING THE EXPOSURE TIME OF THE SENSORS

BACKGROUND OF THE INVENTION

1. Field of the Invention

The present invention relates to a scanner, and more particularly, to an optical scanner that doesn't need an automatic gain control unit.

2. Description of the Prior Art

When scanning a document with a typical scanner, the scanning module produces an induced voltage that is related to the amount of light received from the document. This induced voltage is passed on to an automatic gain control unit for scaling, and is then sent on to an A/D (analog to digital) converter where it is converted into a digital image signal.

Please refer to FIG. 1. FIG. 1 is a function block diagram of a prior art scanner 10. The scanner 10 comprises a scanning module 12 for scanning a document and generating corresponding image signals, a cathode-ray tube 16 for providing light to the document, a power supply 18 for supplying power to the cathode-ray tube 16, and a control circuit 20 for controlling the operations of the scanner 10.

The scanning module 12 comprises a plurality of color detectors 14, a shift register 22, an output unit 28, an automatic gain control unit 30 and an A/D (analog to digital) converter 32. The color detectors 14 are used to detect light of different color and generate an electric charge that corresponds to the amount of light received. The shift register 22 has a plurality of serially connected storage units and an output port 26 into which the contents of the storage units can be sequentially placed. The output unit 28 is electrically connected to the output port 26 of the shift register, receiving the electric charge held in the storage units 24 and outputting a corresponding voltage. The automatic gain control unit 30 receives and adjusts the voltage from the output unit 28, passing the adjusted voltage on to the A/D converter 32. The A/D converter converts the analog voltage from the automatic gain control unit 30 into a digital image signal.

The color detectors 14, shift register 22 and output unit 28 of the scanning module 12 are installed in a single light converting module 34. The number of storage units 24 and the number of color detectors 14 are in proportion. Each color detector 14 is electrically connected to one or more storage units 24. The storage units 24 are used to store the electric charge generated by the connected color detectors 14. This stored charge can be sequentially moved to the output unit 28.

The power supply 18 of the scanner 10 continuously supplies power to the cathode-ray tube 16, and the control circuit 20 controls the exposure time, which is the same for all of the color detectors 14, to control the amount of induced charge generated by the color detectors. The shift register 22 sequentially sends the induced charge in the storage units 24 to the output unit 28 to create an induced voltage. However, the induced voltage cannot be directly sent to the A/D converter 32 to be converted into a digital image signal. The induced voltage must first be adjusted to lie within the working range of the A/D converter 32. Consequently, the induced voltage must be adjusted by the automatic gain control unit. This automatic gain control unit is an extra expense in the scanner circuitry. Furthermore, under identical exposure conditions, the induced charge generated by the color detectors 14 under red, green and blue light is not the same, and hence the induced voltages are also not the same. Generally, red light corresponds to about 6 to 7V, green light corresponds to about 8V, and blue light corresponds to about 2 to 3V. In order to account for this factor the design of the automatic gain control unit 30 becomes even more complicated, which also increases costs.

The control circuit 20 controls whether or not the color detectors 14 will receive light from the cathode-ray tube 16 and convert it into induced charge. In the prior art, the power supply supplies power to the cathode-ray tube 16 even if the color detectors 14 are in a state where they are incapable of receiving light. Thus, a lot of power is wasted providing illumination when it is not needed. Consider, for example, the prior art scanners which use CCDs as the color detectors 14. Due to the electrical characteristics of CCD circuits, the next exposure has to wait until the charge received from the previous exposure has been sequentially converted into the corresponding induced voltage, passed on to the automatic gain control unit 30 and the A/D converter 32, and then transmitted to memory 36. During this time, the cathode-ray tube continues to provide light which cannot be used by the CCD.

When scanners are developed for high-resolution applications, the number of cells in the CCD increases linearly. The time required, then, for the CCD to transmit charge also increases linearly, and so the power wasted by the cathode-ray tube 16 becomes even more serious. Nearly every country in the world has begun implementing energy-management standards for electronic products, and these standards are becoming more and more strict. Reducing the power consumption of the cathode-ray tube 16 becomes an important theme.

SUMMARY OF THE INVENTION

It is therefore a primary objective of the present invention to provide a scanner to solve the above mentioned problems.

In a preferred embodiment, the present invention provides an optical scanner comprising:
- a scanning module comprising a plurality of color detectors for detecting light of different colors when scanning a document to generate corresponding electric charge;
- a cathode-ray tube for providing light to the document;
- a power supply for supplying power to the cathode-ray tube; and
- a control circuit for controlling operations of the optical scanner and the power supply;

wherein the control circuit controls an exposure time of each of the color detectors according to the sensitivity of the color detector to its corresponding color of light so that the amount of electric charge generated by each of the color detectors during each exposure can be controlled.

It is an advantage of the present invention that the scanner does not need to use an automatic gain control unit to scale the induced voltages. Hence, the cost of the components and assembly of the scanner can be largely reduced. A lot of time can also be saved in high-resolution applications because adjusting the induced voltages for wide rows of pixels is no longer required. In addition, the power supply supplies power to the cathode-ray tube 46 in a discontinuous manner, further reducing the power consumption of the scanner.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 2:
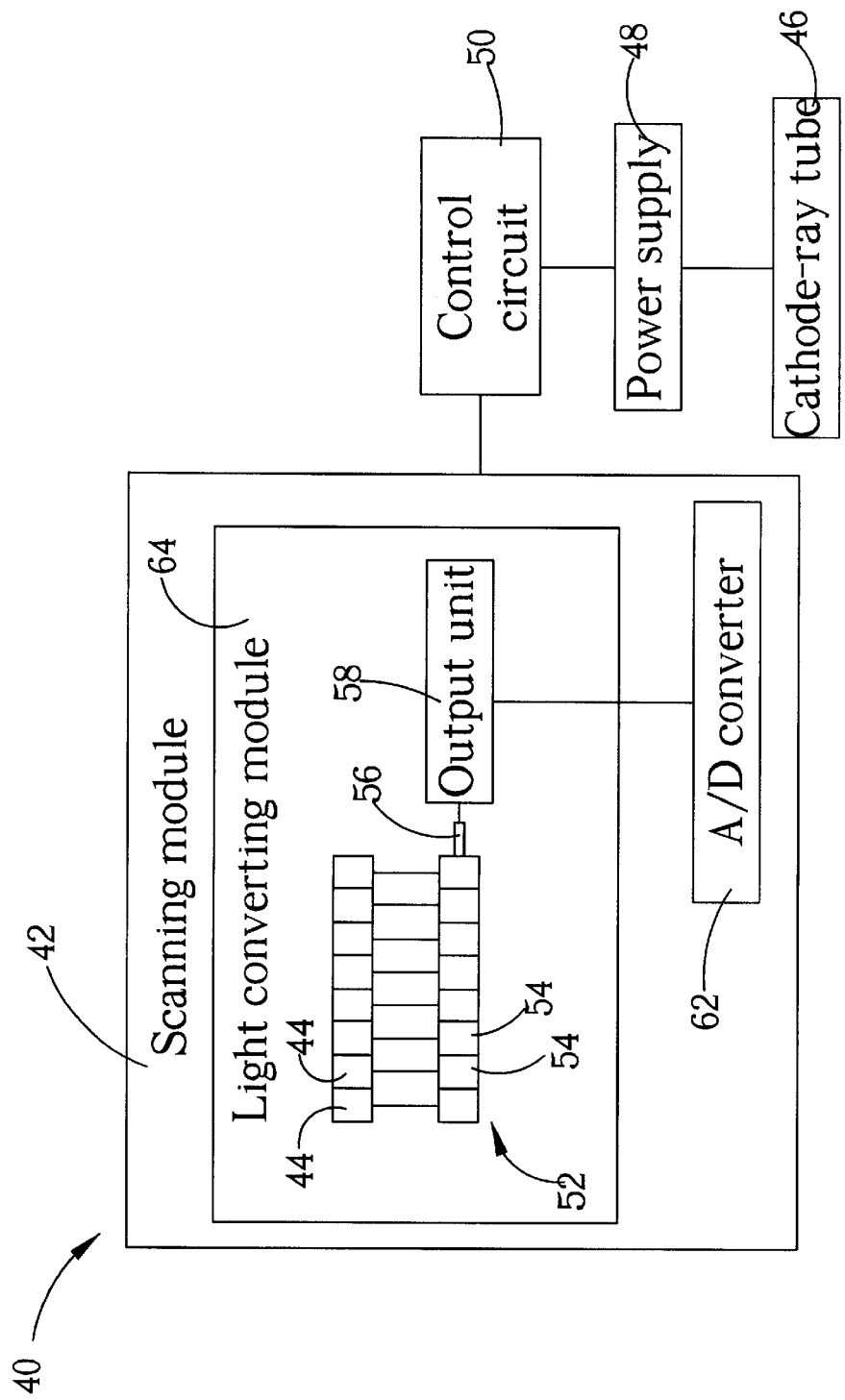
FIG. 2 is a function block diagram of a scanner according to the present invention.

Please refer to FIG. 2. FIG. 2 is a function block diagram of an optical scanner 40 according to the present invention. The optical scanner 40 comprises a scanning module 42 used for scanning a document and generating corresponding image signals, a cathoderay tube 46 for providing light to the document, a power supply 48 for supplying power to the cathode-ray tube 46, and a control circuit 50 for controlling operations of the optical scanner 40 and the power supply 48.

The scanning module 42 comprises a plurality of color detectors 44 for detecting light of different colors and generating a corresponding electric charge, a shift register 52 having a plurality of serially connected storage units 54 and an output port 56, an output unit 58 electrically connected to the output port 56 of the shift register 52 for receiving the electric charge stored in the storage units 54 and outputting a corresponding voltage and an A/D (analog to digital) converter 62 electrically connected to the output unit 58 for receiving the voltage outputted from the output unit 58 and converting it into a digital image signal.

The color detectors 44, shift register 52, and output unit 58 of the scanning module 42 are installed in a single light converting module 64. The number of storage units 54 and the number of color detectors 44 are in proportion. Each of the color detectors 44 is electrically connected to one or more storage units 54. Each of the storage units 54 is used for storing the electric charge generated by the connected color detector 44, and the electric charge stored in the storage units 54 can be sequentially moved to the output port 56.

Figure 1:
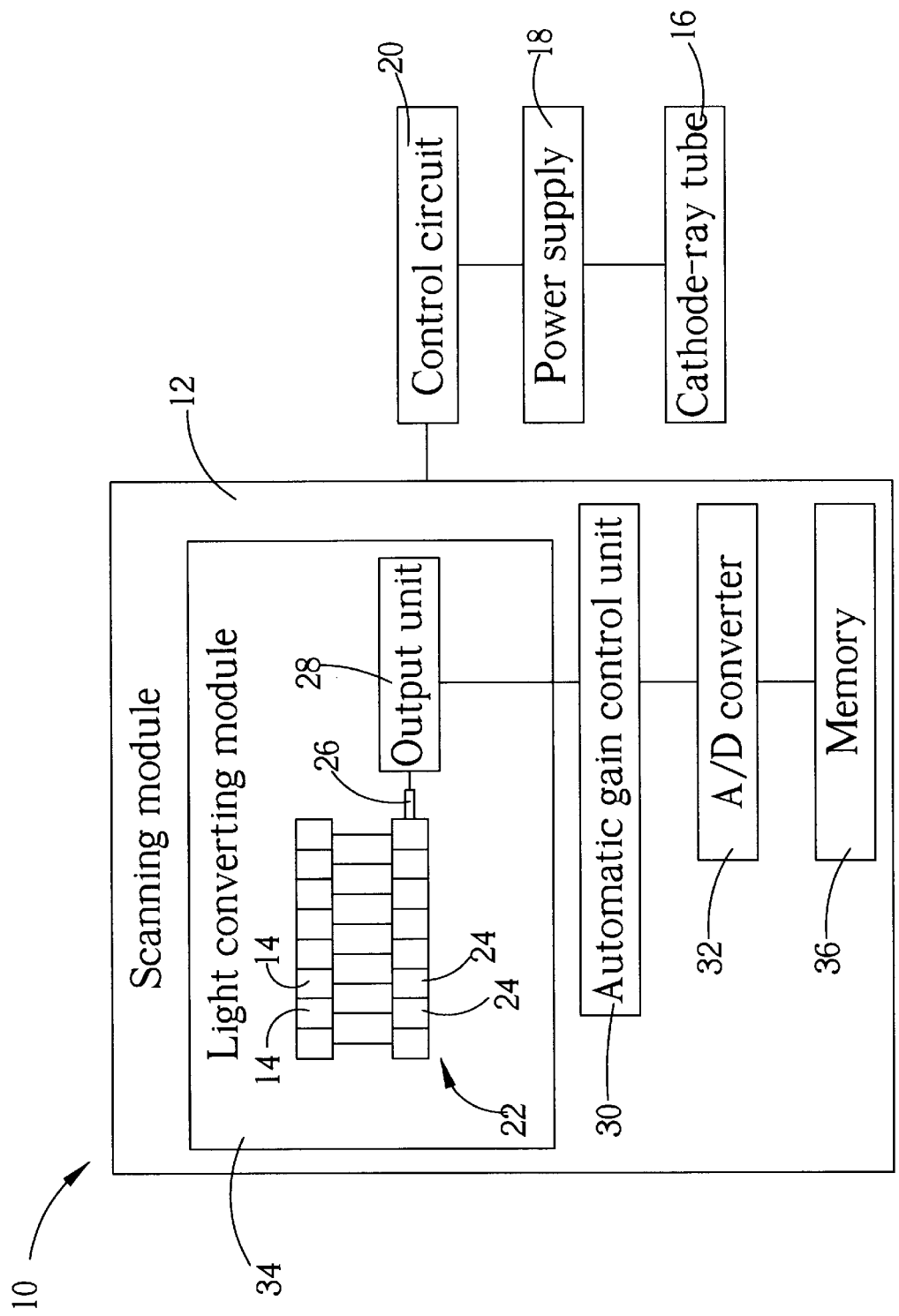
FIG. 1 is a function block diagram of a scanner according to the prior art.

The control circuit 50 controls the interval in which the power supply 48 supplies power to the cathode-ray tube 46. The control circuit 50 also controls an exposure time for each of the color detectors 44 according to the sensitivity of the color detector to its corresponding color of light. In this manner, the amount of electric charge generated by each of the color detectors 44 during each exposure is controlled so as to make all of the induced voltages generated by the color detectors 44 lie within the working voltage range of the A/D converter 62. For example, as previously mentioned, the induced voltage of blue light is about 2 to 3V and the induced voltage of green light is about 8V. The control circuit 50 controls the time period within which the power supply 48 supplies power to the cathode-ray tube 46 so that the exposure time for the blue light color detectors 44 is longer than the exposure time for the green light color detectors 44. The amount of induced charge generated by the color detectors 44 after exposure is sufficient so that the induced voltage outputted by the output unit 58 does not need amplification by an automatic gain control unit shown in FIG. 1. The induced voltage can instead be directly converted by the A/D converter 62 into digital image signals.

In certain situations, some of the color detectors may become saturated even though the induced charge is not large enough to create an induced voltage that would be within the working voltage range of the A/D converter 62. According to the adjusting method of the present invention, only a single amplifier is needed to bring the induced voltages into the working range of the A/D converter 62, since the different exposure times of the different color detectors has already provided for the relative scaling values between the detectors.

In the prior art configuration, an enormous row of pixels had to be passed to the automatic gain control unit a pixel at a time to scale the induced voltages. In the present invention this can all be skipped, or replaced by a simple amplifier with a shorter propagation delay, so the present invention saves a lot of time in this regard. Furthermore, the cathode-ray tube 46 is not always on while scanning. It is turned on and off as needed to control the amount of induced charge. This reduces the power consumption of the scanner 40. Nowadays, cathode-ray tubes are made so well that the delay time for turning them on and off is extremely short. Just like scanners which use light emitting diodes as the light source and so do not need time to warm up, the scanner of the present invention can maintain scanning speed as well as reduce both costs and power consumption.

Compared to the scanner 10 of the prior art, the scanner 40 of the present invention does not need to use an automatic gain control unit to scale the induced voltages output by the output unit 58. It can achieve the same effect with a simple amplifier. Thus, the component and assembly costs of the scanner 40 are largely reduced. The scanner is also faster for high-resolution scans as it requires less time adjusting the induced voltage of an enormous row of pixels. In addition, the power supply 48 supplies power to the cathode-ray tube 46 only as required, reducing the power consumption of the scanner 40.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical scanner comprising:
   a scanning module comprising:
      a plurality of color detectors for detecting light of different colors when scanning a document to generate corresponding electric charge;
      a shift register comprising a plurality of serially connected storage units and an output port, the number of the storage units and the number of the color detectors being in proportion, each of the color detectors being electrically connected to one or more storage units, each of the storage units being used for storing the electric charge generated by the connected color detector, the electric charge stored in the storage units being able to be sequentially moved to the output port;
      an output unit electrically connected to the output port of the shift register for receiving the electric charge stored in the storage units and outputting a corresponding voltage; and
      an A/D (analog to digital) converter electrically connected to the output unit for receiving the voltage outputted from the output unit and converting it into a digital image signal;
   a cathode-ray tube for providing light to the document;
   a power supply for supplying power to the cathode-ray tube; and
   a control circuit for controlling operations of the optical scanner and the power supply;
   wherein the control circuit controls an exposure time of each of the color detectors according to the color of light being detected so that the amount of electric charge generated by the color detectors will cause the output unit to generate a voltage which can be directly converted into the digital image signal by using the A/D converter without first being amplified.

2. The optical scanner of claim 1 wherein the color detectors, shift register, and output unit of the scanning module are installed in a single light converting module.

3. A method for providing electrical power to a light source of an optical scanner, the scanner comprising:
a scanning module comprising:
a plurality of color detectors for detecting light of different colors when scanning a document to generate corresponding electric charge;
a shift register comprising a plurality of serially connected storage units and an output port, the number of the storage units and the number of the color detectors being in proportion, each color detector being electrically connected to one or more storage units, each of the storage units being used for storing electric charge generated by the connected color detector, the electric charge stored in the storage unit being able to be sequentially moved to the output port;
an output unit electrically connected to the output port of the shift register for receiving the electric charge stored in the storage units and outputting a corresponding voltage; and
an A/D converter electrically connected to the output unit for receiving the voltage outputted from the output unit and converting it into a digital image signal;
a cathode-ray tube for providing light to the document; and
a power supply for supplying power to the cathode-ray tube;
the method comprising:
controlling an exposure time for each of the color detectors according to color of light being detected so that the amount of electric charge generated by each of the color detectors during each exposure can be controlled,
wherein the amount of the electric charge generated by the color detectors will cause the output unit to generate a voltage which can be directly converted into the digital image signal by using the A/D converter without being amplified first.

4. The method of claim 3 wherein the scanner comprises a control circuit for controlling the optical scanner and the time period during which the power supply delivers electrical power to the cathode-ray tube.

5. The method of claim 3 wherein the color detectors, shift register, and output unit of the scanning module are installed in a single light converting module.

6. A method for operating a scanner, the scanner comprising:
an analog-to-digital converter;
a scanning module comprising a plurality of color detectors for detecting light of different predetermined colors when scanning a document to generate corresponding electric charge;
a light source for providing light to the document; and
a power supply for supplying power to illuminate the light source;
the method comprising:
controlling an exposure time for each of the color detectors according to the color of light detected so that the amount of electric charge generated by the color detectors during each exposure induces voltages within the working voltage range of the analog-to-digital converter.

7. The method of claim 6 wherein power is supplied to the light source during each exposure time and power is not supplied to the light source between exposure times.

8. The method of claim 6 wherein the induced voltages can be directly converted into a digital image signal by using the analog-to-digital converter without being amplified first by an automatic gain control unit.

9. The method of claim 8 wherein the light source is a cathode-ray tube.

10. The method of claim 6 wherein the scanning module further comprises:
a shift register comprising a plurality of serially connected storage units and an output port, the number of the storage units and the number of the color detectors being in proportion, each color detector being electrically connected to one or more storage units, each of the storage units being used for storing electric charge generated by the connected color detector, the electric charge stored in the storage units being able to be sequentially moved to the output port; and
an output unit electrically connected to the output port of the shift register for receiving the electric charge stored in the storage units and outputting a corresponding voltage to the analog-to-digital converter.

* * * * *